United States Patent
Tsunoda

(10) Patent No.: US 9,753,123 B2
(45) Date of Patent: Sep. 5, 2017

(54) SYSTEM AND METHOD TO PROVIDE A DYNAMIC SITUATIONAL AWARENESS OF ATTACK RADAR THREATS

(71) Applicant: Raytheon Company, Waltham, MA (US)

(72) Inventor: Stanley I. Tsunoda, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 355 days.

(21) Appl. No.: 14/566,830

(22) Filed: Dec. 11, 2014

(65) Prior Publication Data

US 2016/0349355 A1 Dec. 1, 2016

(51) Int. Cl.
*G01S 7/36* (2006.01)
*G01S 7/02* (2006.01)
*G01S 5/02* (2010.01)

(52) U.S. Cl.
CPC ........ *G01S 7/36* (2013.01); *G01S 5/02* (2013.01); *G01S 7/021* (2013.01)

(58) Field of Classification Search
CPC ........................................................ G01S 7/36
USPC ............................................................ 342/16
See application file for complete search history.

(56) References Cited

U.S. PATENT DOCUMENTS

| | | | |
|---|---|---|---|
| 4,700,191 A * | 10/1987 | Manor .................... | G01S 7/021 340/502 |
| 5,083,129 A | 1/1992 | Valentine et al. | |
| 5,122,801 A | 6/1992 | Hughes | |
| 5,151,701 A | 9/1992 | Valentine et al. | |
| 5,245,347 A * | 9/1993 | Bonta .................... | G01S 7/2813 342/149 |
| 5,406,286 A * | 4/1995 | Tran ....................... | G01S 7/021 342/13 |
| 5,426,434 A * | 6/1995 | Bishop .................. | G01S 13/781 342/13 |
| 5,451,956 A * | 9/1995 | Lochhead ............ | G01R 29/027 324/76.38 |
| 5,457,460 A * | 10/1995 | Tran ...................... | G09B 19/165 342/13 |
| 5,638,281 A * | 6/1997 | Wang ..................... | G01J 3/453 342/29 |
| 6,054,949 A * | 4/2000 | Grassmann ......... | G01R 29/0892 342/380 |
| 6,201,482 B1 * | 3/2001 | Schiefele ............. | G08G 5/006 340/961 |

(Continued)

FOREIGN PATENT DOCUMENTS

| | | | |
|---|---|---|---|
| EP | 2706371 | 3/2014 | |
| WO | WO 2008045582 A2 * | 4/2008 | ............. F41G 7/008 |
| WO | WO 2009045573 A1 * | 4/2009 | ............. F41F 3/055 |

OTHER PUBLICATIONS

Search Report and Written Opinion mailed May 3, 3016 in corresponding PCT Application No. PCT/US2015/045050 filed Aug. 13, 2015.

*Primary Examiner* — Timothy A Brainard
(74) *Attorney, Agent, or Firm* — Burns & Levinson, LLP; Joseph M. Maraia

(57) ABSTRACT

A more dynamic situational awareness may be provided by processing received attack radar pulses in a radar warning receiver in such a way as to provide an indication of where the aircraft is within the transmit beamwidth of the attack radar.

19 Claims, 3 Drawing Sheets

(56) References Cited

U.S. PATENT DOCUMENTS

| | | | | |
|---|---|---|---|---|
| 6,639,545 B1* | 10/2003 | Hager | | G01S 7/292 |
| | | | | 342/107 |
| 6,744,401 B2* | 6/2004 | Hager | | G01S 7/292 |
| | | | | 342/118 |
| 6,980,151 B1* | 12/2005 | Mohan | | G01S 7/414 |
| | | | | 342/118 |
| 7,068,209 B2* | 6/2006 | Gounalis | | G01S 7/021 |
| | | | | 342/13 |
| 7,212,148 B1* | 5/2007 | Torres | | F41H 11/02 |
| | | | | 342/13 |
| 7,221,307 B1* | 5/2007 | Friesel | | G01S 7/41 |
| | | | | 342/13 |
| 7,292,178 B1* | 11/2007 | Woodell | | G01S 7/04 |
| | | | | 342/104 |
| 7,504,982 B2* | 3/2009 | Berg | | F41G 5/08 |
| | | | | 342/13 |
| 7,609,200 B1* | 10/2009 | Woodell | | G01S 13/953 |
| | | | | 342/176 |
| 7,696,919 B2* | 4/2010 | Moraites | | F41G 3/147 |
| | | | | 342/107 |
| 7,741,991 B1* | 6/2010 | MacBean | | F41G 7/2213 |
| | | | | 342/141 |
| 7,782,246 B2* | 8/2010 | McGuire | | F41G 5/08 |
| | | | | 342/113 |
| 7,977,614 B2* | 7/2011 | Raviv | | F41F 3/04 |
| | | | | 244/3.1 |
| 8,122,810 B2* | 2/2012 | Glasson | | F41H 11/04 |
| | | | | 102/336 |
| 8,258,998 B2* | 9/2012 | Factor | | G01S 7/36 |
| | | | | 342/12 |
| 8,279,109 B1* | 10/2012 | Piesinger | | G01S 7/412 |
| | | | | 342/43 |
| 8,441,392 B2* | 5/2013 | Descharles | | G01S 13/4445 |
| | | | | 342/140 |
| 8,639,394 B2* | 1/2014 | Herman | | F41H 11/02 |
| | | | | 250/338.1 |
| 8,672,223 B2* | 3/2014 | Factor | | F41H 11/02 |
| | | | | 235/400 |
| 8,744,390 B2* | 6/2014 | Stratford | | H04B 17/12 |
| | | | | 343/703 |
| 8,748,787 B2* | 6/2014 | Weiss | | F41G 3/04 |
| | | | | 244/3.1 |
| 9,007,255 B2* | 4/2015 | Jarvis | | G01S 11/06 |
| | | | | 342/182 |
| 2005/0073439 A1* | 4/2005 | Perricone | | G01S 7/021 |
| | | | | 340/945 |
| 2005/0237236 A1* | 10/2005 | Budic | | G01S 7/414 |
| | | | | 342/159 |
| 2005/0275582 A1* | 12/2005 | Mohan | | G01S 7/414 |
| | | | | 342/13 |
| 2010/0026554 A1* | 2/2010 | Longman | | F41G 5/08 |
| | | | | 342/62 |
| 2011/0215960 A1* | 9/2011 | Stevens | | G01S 7/36 |
| | | | | 342/37 |
| 2012/0210851 A1* | 8/2012 | Glasson | | F41A 27/22 |
| | | | | 89/1.8 |
| 2013/0021194 A1* | 1/2013 | Harman | | G01S 13/003 |
| | | | | 342/104 |
| 2013/0106640 A1* | 5/2013 | Wang | | G01S 7/023 |
| | | | | 342/17 |

\* cited by examiner

SYSTEM AND METHOD TO PROVIDE A
DYNAMIC SITUATIONAL AWARENESS OF
ATTACK RADAR THREATS

FIELD OF THE INVENTION

The present invention generally relates to radar warning receivers, and in particular to such receivers which provide a dynamic situational awareness of attack radar threats which would enhance the threat minimization for received attack radar signals.

BACKGROUND OF THE INVENTION

In traditional radar warning receiver displays, a coarse representation of range is displayed for attack radar signals. The range is estimated using the received power and the emitter equivalent radiated power listed in the mission data file. Such a range estimate is useful for a qualitative indication of whether or not the threat is within its lethal range, but cannot be reliably used for an accurate range determination. Secondly, the accurate geolocation of the emitter has often not been available, either through lack of intelligence or through the lack of radar warning receiver capability. Thirdly, the determination of the incident power, which is the power impinging on the aircraft, from the received power, which is the power detected by the radar warning receiver, has been hampered by the difficulty in obtaining an accurate determination of the installed receive antenna gain pattern. If these three issues could be resolved, dynamic situational awareness could be obtained that could assist in minimizing the threat associated with received radar signals.

In view of the above, it would be beneficial to be able to determine more information from received attack radar signals to better provide minimization of radar threats.

SUMMARY OF THE INVENTION

One embodiment of the present invention provides a method for reducing the threat from an attacking radar, comprising the steps of: receiving attack radar transmission signals over time with one or more antennas on an aircraft; identifying attack radar signals in the received transmission signals; measuring the received power at one or more antennas on the aircraft from the received transmission signals for each identified attack radar signal; calculating incident power values at one or more antennas on the aircraft from the received transmission signals for each identified attack radar signal; saving aircraft position data and calculated incident power values as they change with time; calculating changes in the aircraft position and incident power for the identified attack radar signals over time using the saved aircraft position data and incident power values; determining whether the aircraft is moving closer to the center of the attack radar transmitter beamwidth or away from it using the calculated changes in the incident power and the aircraft position; and communicating this indication to the pilot in response to the step of determining.

The step of calculating changes in incident power may include compensating the measured received power for the gain pattern of each receive antenna. The step of compensating the measured received power may take into account the pitch, roll and yaw of the aircraft. The step of calculating where the aircraft is moving within the attack radar transmitter beamwidth may include determining the geolocation of the identified threat radar signal.

Another embodiment of the present invention provides a method for reducing the threat from an attacking radar with multiple aircraft, comprising the steps of: receiving attack radar transmission signals over time with one or more antennas on each of multiple aircraft; identifying attack radar signals in the received transmission signals of each aircraft; measuring the received power at one or more antennas on each aircraft from the received transmission signals for each identified attack radar signal; calculating incident power values at one or more antennas on each aircraft from the received transmission signals for each identified attack radar signal; saving each aircraft's position data and calculated incident power values as they change with time; calculating changes in each aircraft's position and incident power values for the identified attack radar signals over time using the saved aircraft positions and incident powers; determining whether each aircraft is moving closer to or farther away from the center of the attack radar transmitter beamwidth using the calculated changes in their respective incident powers and positions, and comparing where each aircraft is located within the attack radar transmitter beamwidth using the respective calculated. incident powers and positions.

The method may further comprise comparing the incident powers among the aircraft. The method may still further comprise communicating and sharing incident power values and information regarding where each aircraft is within the attack radar transmitter beamwidth among the aircraft. The step of calculating changes in incident power may include compensating the measured received power for a reception gain pattern for each antenna on each aircraft. The step of compensating the measured received power may take into account the pitch, roll and yaw of each aircraft. The method may further comprise determining a transmission geolocation for the identified attack radar signal.

Yet another embodiment of the present invention provides a system for reducing the threat from an attacking radar, comprising: circuitry adapted for receiving radar transmission signals over time with one or more antennas on an aircraft; circuitry adapted for determining the position and attitude of an aircraft; a processor; memory for storing data and including code representing instructions that when executed cause the processor to: identify attack radar signals in the received transmission signals; measure received power at one or more antennas on the aircraft from the received transmission signals for each identified attack radar signal; calculate incident power values at one or more antennas on the aircraft from the received transmission signals for each identified attack radar signal; save aircraft position data and the calculated incident power values as they change over time; calculate changes in the aircraft position and incident power for the identified attack radar signals over time using the saved aircraft position data and incident power values; and determine whether the aircraft is moving closer to the center of the attack radar transmitter beamwidth or away from it using the calculated changes in the incident power and the aircraft position; and means for providing an indicator for controlling aircraft functions in response to knowing where the aircraft is located within the attack radar transmitter beamwidth to enable the pilot to maneuver an aircraft and/or instigate electronic countermeasures to reduce the threat from an identified attack radar.

The code representing instructions which when executed causes the processor to calculate changes in incident power may also cause the processor to compensate the measured received power for the gain pattern for each antenna. The code representing instructions which when executed causes the processor to compensate the measured received power, may also cause the processor to take into account pitch, roll and yaw of the aircraft. The memory may include code representing instructions that when executed cause the processor to determine the transmission geolocation of the identified attack radar signal.

Still another embodiment of the present invention provides a system for multiple aircraft for reducing threat from an attacking radar, comprising: circuitry adapted for receiving radar transmission signals over time with one or more antennas on each aircraft of multiple aircraft; circuitry adapted for determining the position and attitude of each aircraft; a processor on each aircraft; memory on each aircraft for storing data and including code representing instructions that when executed cause the processor to: identify attack radar signals in the received transmission signals; measure received power at one or more antennas on each aircraft from the received transmission signals for each identified attack radar signal; calculate incident power values at one or more antennas on each aircraft from the received transmission signals for each identified attack radar signal, save aircraft position data and the calculated incident power values on each aircraft as they change with time, calculate changes in each aircraft position and incident power for the identified attack radar signals over time using the saved aircraft position data and incident power values; determine whether each aircraft is moving closer to or farther away from the center of the attack radar transmitter beamwidth using the calculated changes in the incident power and the saved aircraft position data, compare the incident powers between aircraft, compare where each aircraft is located within the attack radar transmitter beamwidth using the respective calculated incident powers and aircraft positions, and means for providing an indicator on each aircraft for controlling aircraft functions in response to knowing where each aircraft is located within the attack radar transmitter beamwidth to enable each pilot to maneuver an aircraft and/or instigate electronic countermeasures to minimize an identified radar threat.

The code representing instructions which when executed causes each aircraft's processor to calculate changes in each aircrafts position and changes in incident power may also cause the processor to compensate the measured received power for the gain pattern for each antenna. The code representing instructions which when executed causes each aircraft's processor to compensate the measured received power may also take into account pitch, roll and yaw of the aircraft. The memory may include code representing instructions that when executed cause the processor to determine the transmission geolocation of the identified attack radar signal. The memory code may also cause the processor to communicate and share incident power information and information regarding where each aircraft is within the attack radar transmitter beamwidth among the aircraft.

BRIEF DESCRIPTION OF THE DRAWINGS

The present invention is illustratively shown and described in reference to the accompanying drawings, in which.

DETAILED DESCRIPTION OF THE DRAWINGS

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

Figure 1:
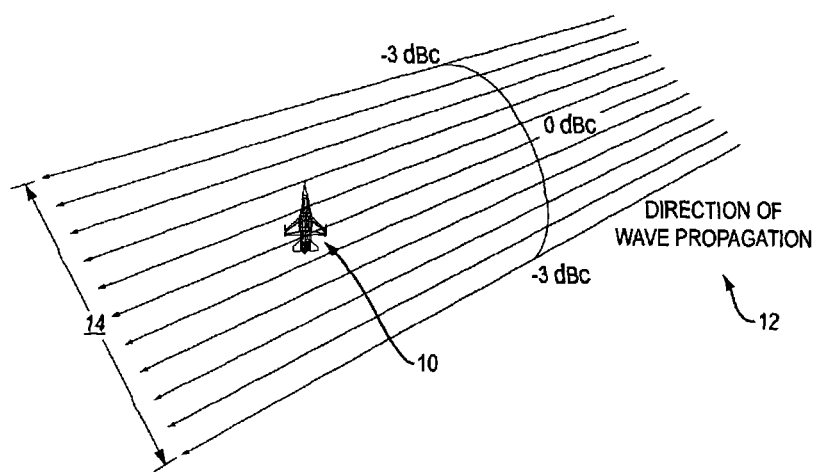
FIG. 1 is a situational schematic depicting an aircraft within an intercepting radar beam.

FIG. 1, depicts an aircraft 10 that is currently within the beam 12 of an intercepting radar. The width 14 of beam 12 at typical distances is of the order of kilometers. A typical time that a tactical aircraft might take to traverse a stationary beam is on the order of tens of seconds. A typical time that it takes for an electronic countermeasure to be effective may also be on the order of tens of seconds. During this time, information on where the aircraft is with respect to the intercepting radar beam can assist the pilot to take action to minimize exposure to the intercepting radar.

Figure 2:
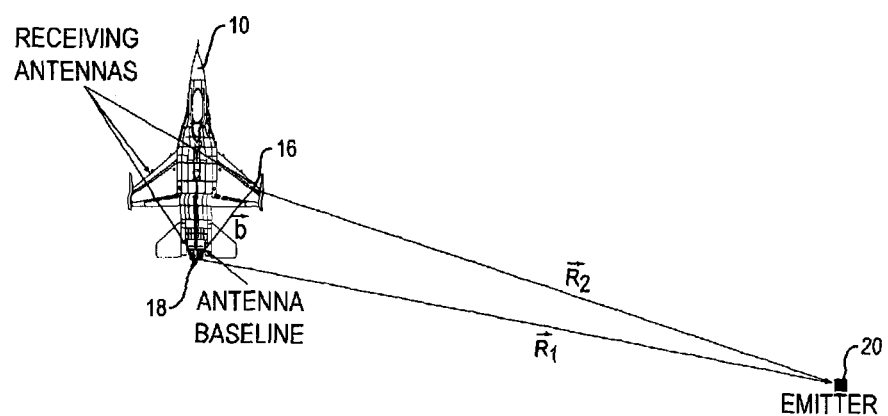
FIG. 2 is a geometric plan view of the use of time difference of arrival and frequency difference of arrival for determining a radar emitter source location.

Signals in the radar signal spectrum are typically received by one or more antennas 16, 18 on an aircraft 10 as shown in FIG. 2. The signals are digitized and stored for analysis by a radar warning receiver (RWR), not shown.

The power density received by an antenna is denoted herein as $P_{rec}$ and the power density incident on the airplane is denoted herein as $P_{inc}$. The incident power is the power impinging on the aircraft and is independent of the aircraft orientation and the receive antenna beam pattern. The determination of how the incident power is changing gives an indication of the location of the aircraft within the beam. The incident power density is given by, $$P_{inc} = \frac{G(\theta - \theta_{boresite}, \varphi - \varphi_{boresite}, \vec{R})P_o}{4\pi R^2} \quad (1)$$

where G is the emitter antenna gain, which is a function of its local angular coordinates referenced to its location with respect to the aircraft, $\vec{R}$. $P_o$ is the transmit power of the emitter. The received power density is given by, $$P_{rec} = \frac{F(\theta_{pitch}, \theta_{roll}, \theta_{yaw})G(\theta - \theta_{boresite}, \varphi - \varphi_{boresite}, \vec{R})P_o}{4\pi R^2} \quad (2)$$

where F expresses the effects of the antenna beam functions of the receiving antennas. P is a function of the orientation of the aircraft with respect to the emitter line of sight direction. Where the aircraft is within the emitter beam is expressed by the value of the emitter gain, G. How the gain changes as the aircraft moves and as the emitter boresite direction changes provides information on the location of the aircraft within the beam. So, from Eq. (2), we may write the ratio of the emitter gain measured at a particular time (primed coordinates) to that measured at an earlier time (unprimed coordinates) as, $$\frac{G(\theta' - \theta'_{boresite}, \varphi' - \varphi'_{boresite}, \vec{R}')}{G(\theta - \theta_{boresite}, \varphi - \varphi_{boresite}, \vec{R})} = \frac{P'_{rec}}{P_{rec}} \left(\frac{R'^2}{R^2}\right) \frac{F(\theta_{pitch}, \theta_{roll}, \theta_{yaw})}{F(\theta'_{pitch}, \theta'_{roll}, \theta'_{yaw})} \quad (3)$$

When the G ratio on the left, hand side of Eq. (3) is greater than unity, the airplane is flying further into the middle of the beam. When it is less than unity, the airplane is flying away from the middle of the beam. The first factor on the right hand side of Eq. (3) is directly measured by the RWR. The second factor uses the location of the emitter. The third factor uses knowledge of the emitter line of sight unit vector, (i.e, geolocation), and also requires precise knowledge of the aircraft installed antenna beam patterns.

The G ratios of Eq. (3) are continually measured and computed as the airplane maneuvers. The G ratios are tracked in a filter to drive down the random errors.

If the attack radar location is known, the range and emitter line of sight vector information can be used with Eq. (2) to determine where the aircraft is within the scanning beam of a radar in search mode. The pilot may be able to use this information to make sure that his aircraft stays sufficiently outside the main portion of the search beam to avoid detection.

Figure 4:
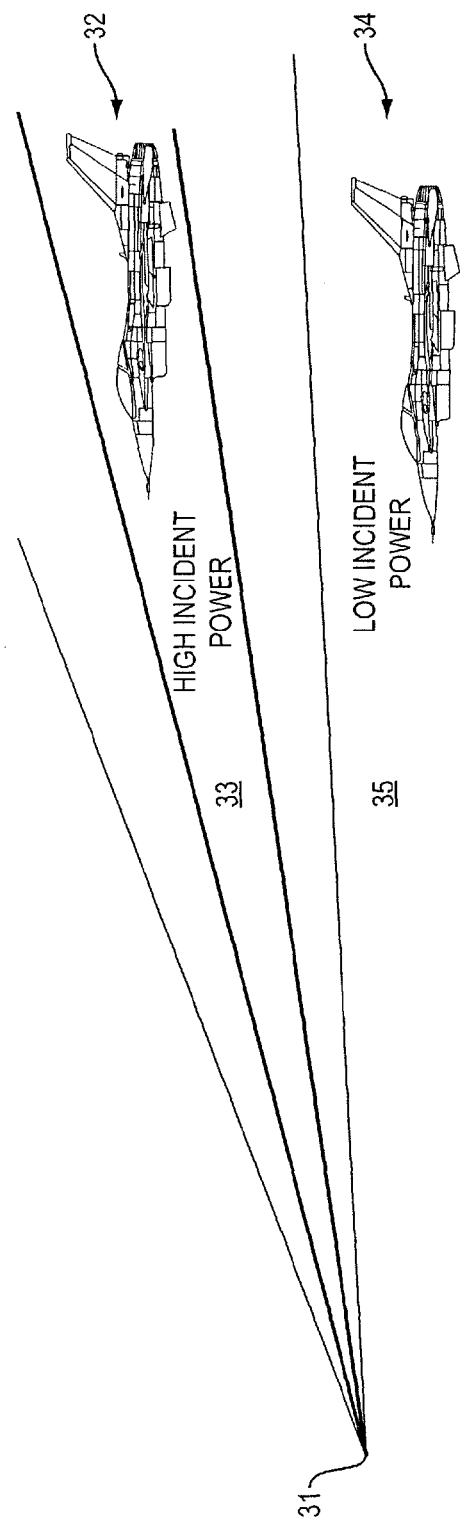
FIG. 4 is a situational schematic of one or two aircraft flying in different portions of a attack radar beam.

FIG. 4 shows another situational schematic of either two aircraft 32, 34 within different portions an attack radar beam, or different possible locations of an aircraft within a beam. Aircraft 32 represents a location within a high incident power beam portion 33 of emitter 31, while aircraft 34 represents a location within a low incident power beam portion 35.

If the attack radar location is not known and a scanning or tracking radar is detected, the pilot could initiate a geolocation determination and G ratio track and then attempt to either maneuver the aircraft outside of the main beam or initiate a countermeasure or both. In this manner, aircraft 34 might change course to avoid heading directly towards emitter 31 and intersecting the high incident power beam portion 33. The pilot can monitor the success or failure of his maneuver/countermeasures with a display indication driven by the G ratio value and make real time adjustments accordingly. Possibilities for displaying the G ratio information include variable intensity or variable color display of the threat symbol. Alternatively, a numerical indication of the G ratio may be displayed. Displaying a history or G values may also be useful.

Under certain circumstances the display may contain more detailed information. If the attack radar has been identified and geolocated and the determination of G via Eq. (2) indicates that the aircraft is in the middle of high incident power beam portion 33, then we may be able to display the beamwidth of the radar beam. This could be done as a pair of short lines on a map display showing the azimuthal extent of the beam at the position of the aircraft and a pair of altitudes indicating the elevation extent of the beam. If the pilot decides to maneuver, then one can make the assumption that the attack radar will lag in its response to the maneuver and the G ratio can be used to monitor the aircraft position within the beamwidth. If the pilot decides to deploy chaff, a towed decoy, or a maneuverable air launched decoy, the G ratio can be used to monitor whether the beam moves towards the chaff or decoy and the display can be updated accordingly. If the pilot decides to initiate a jamming technique such as a velocity gate pull off, the G ratio can be used to determine if the technique successfully caused the expected advance or retardation of the radar track.

When two or more aircraft are flying near a threat, it is often the case that one aircraft 32 is tracked by the intercepting radar while other aircraft 34 are merely in the skirt of the main beam. However, each aircraft RWR may indicate it is being tracked by the intercepting radar. Comparison of G using Eq. (2) among the various airplanes via datalink may allow the pilots to know which of them is the one actually being tracked and potentially targeted. In general, the determination of G using Eq. (2) from multiple aircraft together with the sharing of this information will add to the common situational awareness. The common knowledge and monitoring of the location and extent of the radar beam may make possible new cooperative countermeasures and/or evading maneuvers by multiple aircraft.

The time difference of arrival (TDOA)/frequency difference of arrival (FDOA) approach to passive single ship geolocation is described in co-pending U.S. Patent Published Application, the contents of which are hereby incorporated by reference herein. A brief description of this technique appears below in reference to FIGS. 2 and 3.

Figure 3:
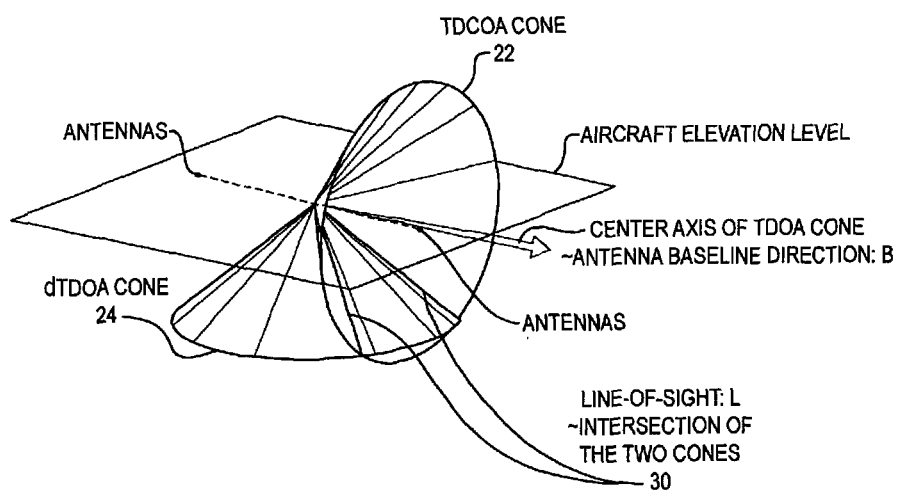
FIG. 3 is a diagram of the relationship between time difference of arrival and frequency difference of arrival determinations.

In FIG. 2, an aircraft 10 is receiving a pulsed signal on two of its receiving antennas. The difference in the arrival times of these pulses at the aircraft is, $$\tau = \frac{1}{c}\left|\vec{R_2} - \vec{R_1}\right| \quad (4)$$

$$= \frac{1}{G}\left|(\vec{R_1} - \vec{b}) - \vec{R_1}\right|$$

$$= -\frac{\vec{b} \cdot \hat{R}}{c}$$

for $|\vec{b}| \ll \vec{R} \approx \vec{R_1} \approx \vec{R_2}$ and where $\hat{R}$ is the line of sight unit vector. This equation describes an equation for the angle between $\vec{b}$ and $\hat{R}$ since we know $\vec{b}$ and we measure $\tau$. The line of sight vector, $\hat{R}$ lies on a TDOA cone 22 centered about $\vec{b}$ with this angle equal to the cone angle. Taking the time derivative of Eq. (4), we obtain $$\frac{d\tau}{dt} = -\frac{1}{c}\left[\frac{d\vec{b}}{dt} \cdot \hat{R} + \vec{b}, \frac{d\vec{R}}{dt}\right] \quad (5)$$

$$= -\frac{1}{c}\left[\frac{d\vec{b}}{dt} + \vec{b} \times \frac{\vec{v}}{R}\right] \cdot \hat{R}$$

where $\vec{v}$ the aircraft velocity. The line of sight vector lines on a dTDOA or FDOA cone 24 centered about the known vector defined in the square brackets. The intersection of the TDOA cone 22 and dTDOA cone 24 determines the line of sight vector. The intersection of the line of sight vector with the earth determines the latitude and longitude of the ground emitter. This is illustrated in FIG. 3. The intersection of the two cones results in two lines 30. The ambiguity is easily resolved from coarse angle of arrival measurements or other means. The errors associated with. Eqs. (4) and (5) are driven down with a tracking technique such as a Kalman filter or a least squares optimization technique.

Figure 5:
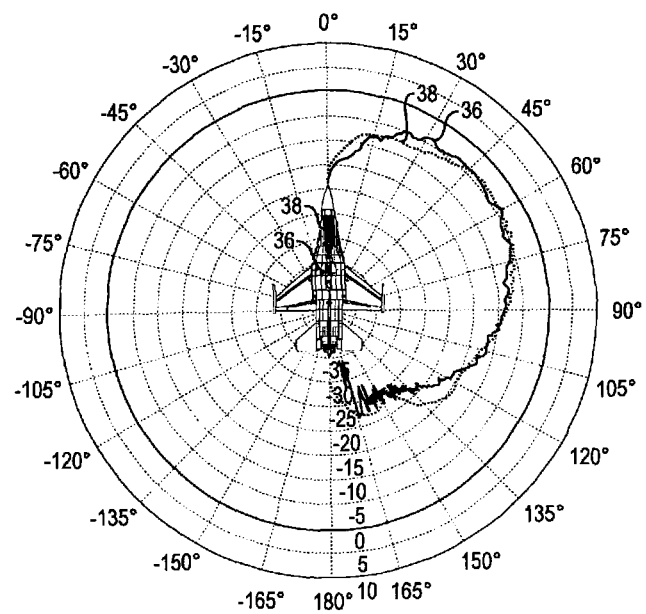
FIG. 5 is a plot of both modeled and measured aircraft installed antenna beam patterns for a vertically polarized forward right aircraft quadrant.

The use of the above technique allows for the determination of the second factor on the right hand side of Eq. (3) and allows for the determination of the line of sight unit vector for the third factor. Information about receiver installed antenna patterns provides further calculation of the third factor. Any suitable method may be used for determining antenna gain patterns, such as range measurements or electromagnetic simulation. FIG. 5 shows the difference between a measured antenna pattern 36 and a simulated pattern 38. Compensation may also be made for installed aircraft equipment and even for control surface movement.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method of reducing a threat from an attacking radar, comprising the steps of:
   receiving attack radar transmission signals over time at one or more antennas on an aircraft;
   identifying attack radar signals in the received attack radar transmission signals;
   measuring the received power at one or more antennas on the aircraft from the received attack radar transmission signals for each identified attack radar signal;
   calculating incident power values at one or more antennas on the aircraft from the received power measures of the received attack radar transmission signals for each identified attack radar signal;
   saving aircraft position data and the calculated incident power values as they change with time;
   calculating changes in the aircraft position and incident power values for the identified attack radar signals over time using the saved aircraft position data and incident power values;
   determining whether the aircraft is moving closer to, or away from, a center of the attack radar transmission signal beamwidth using the calculated changes in the incident power values and the aircraft position; and
   communicating a result of the determination whether the aircraft is moving closer to, or away from, the center of the attack radar transmission signal beamwidth to a pilot of the aircraft.

2. The method of claim 1, wherein the step of calculating changes in the incident power values includes compensating the measured received power for a reception gain pattern of each receiving antenna.

3. The method of claim 2, wherein the step of compensating the measured received power takes into account the pitch, roll and yaw of the aircraft.

4. The method of claim 1, wherein the step of determining whether the aircraft is moving closer to, or away from, the center of the attack radar transmission signal includes determining a geolocation of an emitter of the identified attack radar signal.

5. A method of reducing a threat from an attacking radar, comprising the steps of:
   receiving attack radar transmission signals over time at one or more antennas on each of multiple aircraft;
   identifying attack radar signals in the received attack radar transmission signals of each aircraft;
   measuring the received power at one or more antennas on each aircraft from the received attack radar transmission signals for each identified attack radar signal;
   calculating incident power values at one or more antennas on each aircraft from the received power measures of the received attack radar transmission signals for each identified attack radar signal;
   saving each aircraft's position data and the calculated incident power values as they change with time;
   calculating changes in each aircraft's position and incident power values for the identified attack radar signals over time using the saved aircraft positions and incident power values;
   determining whether each aircraft is moving closer to or farther away from a center of the attack radar transmission signal beamwidth using the calculated changes in their respective incident powers and aircraft positions;
   comparing where each aircraft is located within the attack radar transmission signal beamwidth using the respective calculated incident power values and positions; and
   communicating a result of the comparing step among the multiple aircraft to enable a pilot to maneuver the aircraft and/or instigate electronic countermeasures to reduce the threat from the identified attacking radar.

6. The method of claim 5, further comprising comparing the incident power values among the multiple aircraft.

7. The method of claim 5, further comprising communicating and sharing among the multiple aircraft incident power values and information regarding where each aircraft is within the attack radar transmission signal beamwidth.

8. The method of claim 5, wherein the step of calculating changes in incident power values includes compensating the measured received power for a reception gain pattern of each receiving antenna on each aircraft.

9. The method of claim 8, wherein the step of compensating the measured received power takes into account the pitch, roll and yaw of each aircraft.

10. The method of claim 5, further comprising determining a geolocation of an emitter of the identified attack radar signals.

11. A system for reducing a threat from an attacking radar, comprising:
    circuitry adapted for receiving attack radar transmission signals over time at one or more antennas on an aircraft;
    circuitry adapted for determining a position and attitude of the aircraft;
    a processor coupled to the position and attitude determining circuitry and to the attack radar transmission signals receiving circuitry;
    a memory, coupled to the processor, for storing data and including code representing instructions that when executed cause the processor to:
    identify attack radar signals in the received attack radar transmission signals;
    measure received power at one or more antennas on the aircraft from the received attack radar transmission signals for each identified attack radar signal;
    calculate incident power values at one or more antennas on the aircraft from the received power measures of the received attack radar transmission signals for each identified attack radar signal, save in the memory the aircraft position data and the calculated incident power values as they change over time, calculate changes in the aircraft position and incident power for the identified attack radar signals over time using the saved aircraft position data and the saved incident power values; and
    determine whether the aircraft is moving closer to, or away from, a center of the attack radar transmission signal beamwidth using the calculated changes in the incident power and the aircraft position; and
    means for providing an indicator for controlling aircraft functions in response to a result of the determination whether the aircraft is moving closer to, or away from, the center of the attack radar transmission signal beamwidth, coupled to the processor, to enable a pilot to maneuver the aircraft and/or instigate electronic countermeasures to reduce the threat from the identified attacking radar.

12. The system of claim 11, wherein the code representing instructions which when executed causes the processor to calculate changes in incident power values also causes the processor to compensate the measured received power for a reception gain pattern of each receiving antenna.

13. The system of claim 12, wherein the code representing instructions which when executed causes the processor to compensate the measured received power, also causes the processor to take into account pitch, roll and yaw of the aircraft.

14. The system of claim 11, wherein the memory includes code representing instructions that when executed cause the processor to determine a geolocation of an emitter of the identified attack radar signal.

15. A system for reducing a threat from an attacking radar, comprising:
   circuitry adapted for receiving attack radar transmission signals over time at one or more antennas on each aircraft of multiple aircraft;
   circuitry adapted for determining a position and attitude of each aircraft;
   a processor on each aircraft, coupled to the position and attitude determining circuitry and to the attack radar transmission signals receiving circuitry;
   memory, coupled to the processor, on each aircraft for storing data and including code representing instructions that when executed cause the processor to:
      identify attack radar signals in the received attack radar transmission signals;
      measure received power at one or more antennas on each aircraft from the received attack radar transmission signals for each identified attack radar signal;
      calculate incident power values at one or more antennas on each aircraft from the received power measures of the received attack radar transmission signals for each identified attack radar signal, save in the memory the aircraft position data and the calculated incident power values on each aircraft as they change with time, calculate changes in each aircraft's position and incident power for the identified attack radar signals over time using the saved aircraft position data and incident power values;
      determine whether each aircraft is moving closer to or farther away from a center of the attack radar transmission signal beamwidth using the saved calculated changes in the incident power values and the saved aircraft position data;
      compare the incident powers values between aircraft;
      compare where each aircraft is located within the attack radar transmission signal beamwidth using the respective calculated incident power values and aircraft positions; and
   means for providing an indicator on each aircraft for controlling aircraft functions in response to a result of the comparison of where each aircraft is located within the attack radar transmission signal beamwidth, coupled to the processor, to enable each pilot to maneuver an aircraft and/or instigate electronic countermeasures to minimize an identified radar threat.

16. The system of claim 15, wherein the code representing instructions which when executed causes each aircraft's processor to calculate changes in each aircraft's position and changes in incident power values also causes the processor to compensate the measured received power for a reception gain pattern of each antenna.

17. The system of claim 16, wherein the code representing instructions which when executed causes each aircraft's processor to compensate the measured received power also takes into account pitch, roll and yaw of the aircraft.

18. The system of claim 15, wherein the memory includes code representing instructions that when executed cause the processor to determine a geolocation of an emitter of the identified attack radar signal.

19. The system of claim 15, wherein the memory includes code representing instructions that when executed also causes the processor to communicate and share among the aircraft incident power information and information regarding where each aircraft is within the attack radar transmission signal beamwidth.

* * * * *